J. W. PRICE.
STEERING DEVICE FOR MOTOR VEHICLES.
APPLICATION FILED NOV. 28, 1919.
1,356,170.
Patented Oct. 19, 1920.
3 SHEETS—SHEET 1.
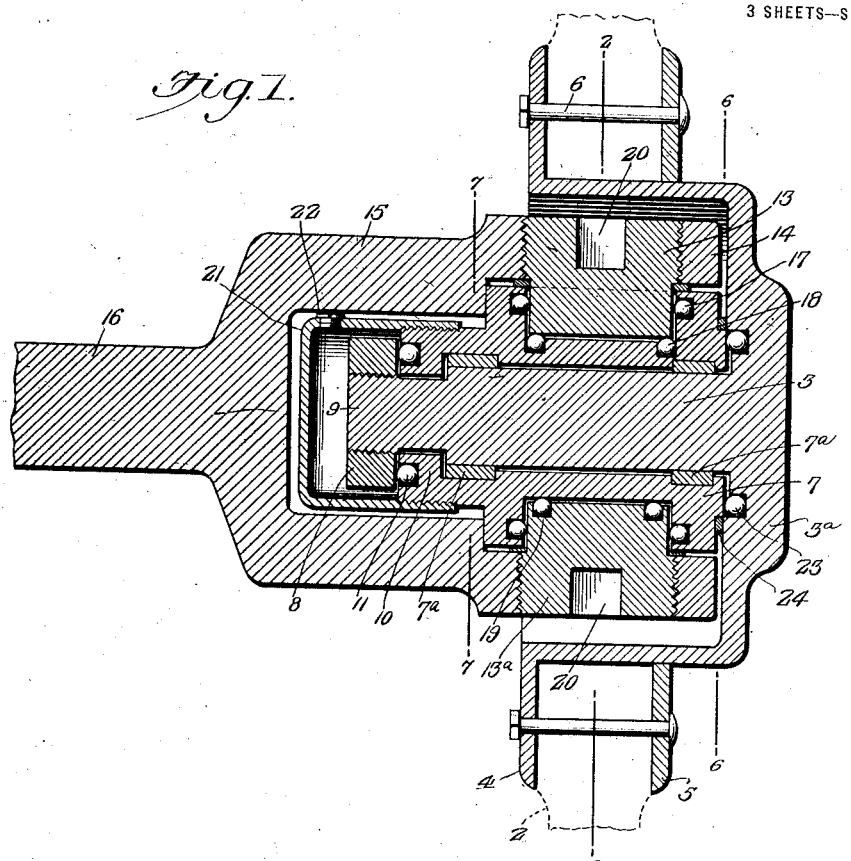
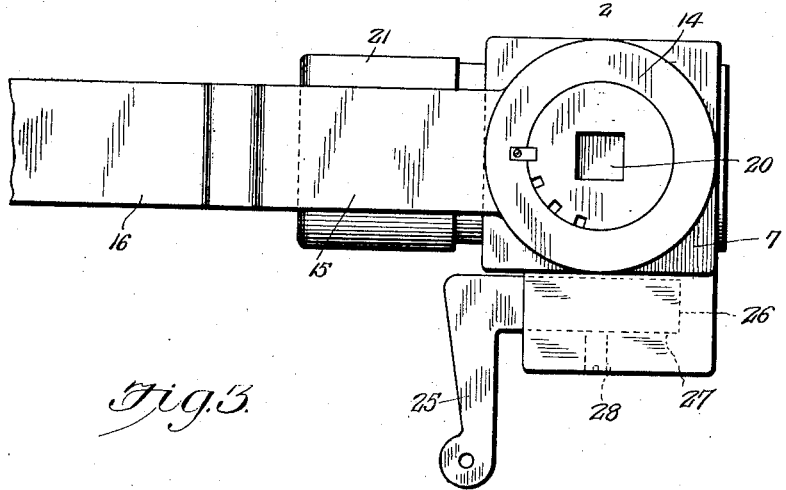
WITNESSES
INVENTOR
J. W. Price,
BY
ATTORNEYS J. W. PRICE.
STEERING DEVICE FOR MOTOR VEHICLES.
APPLICATION FILED NOV. 28, 1919.
1,356,170.
Patented Oct. 19, 1920.
3 SHEETS—SHEET 2.
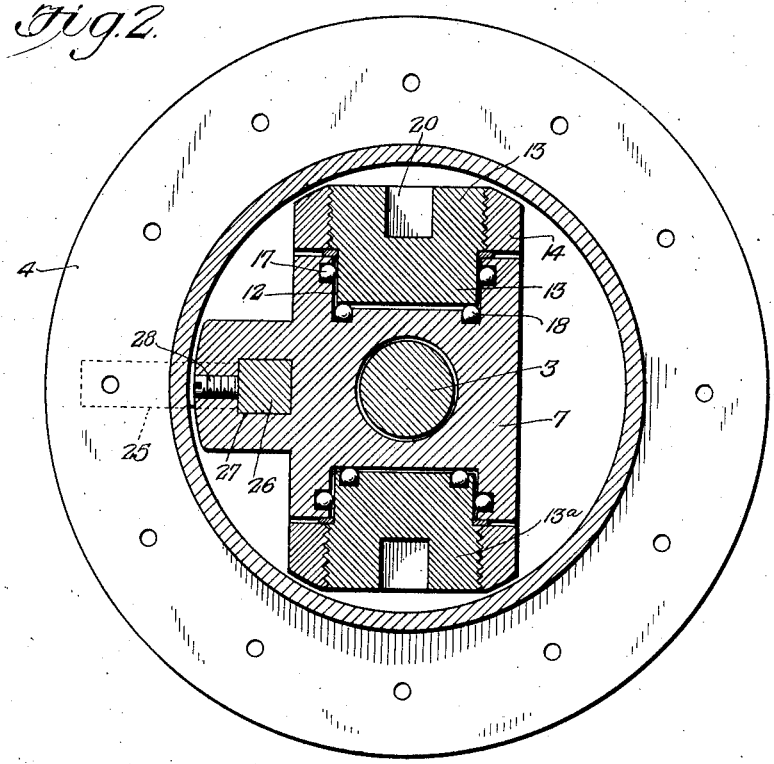
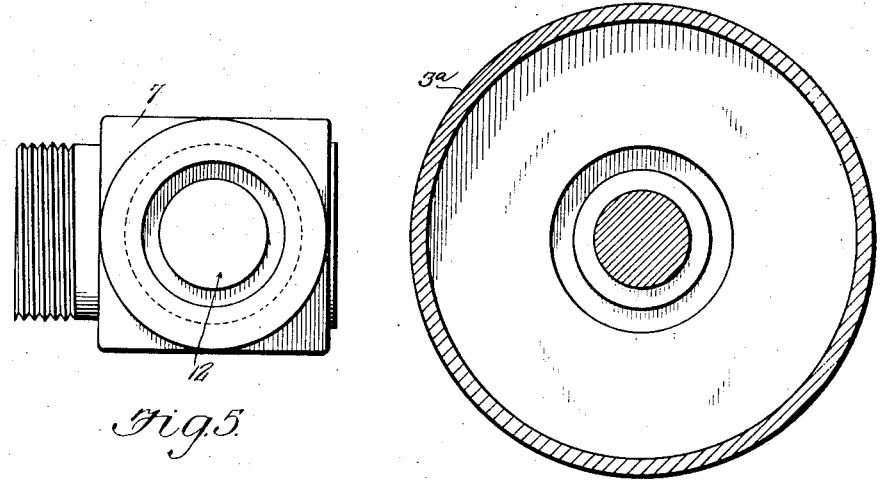

J. W. PRICE.
STEERING DEVICE FOR MOTOR VEHICLES.
APPLICATION FILED NOV. 28, 1919.
1,356,170.
Patented Oct. 19, 1920.
3 SHEETS—SHEET 3.
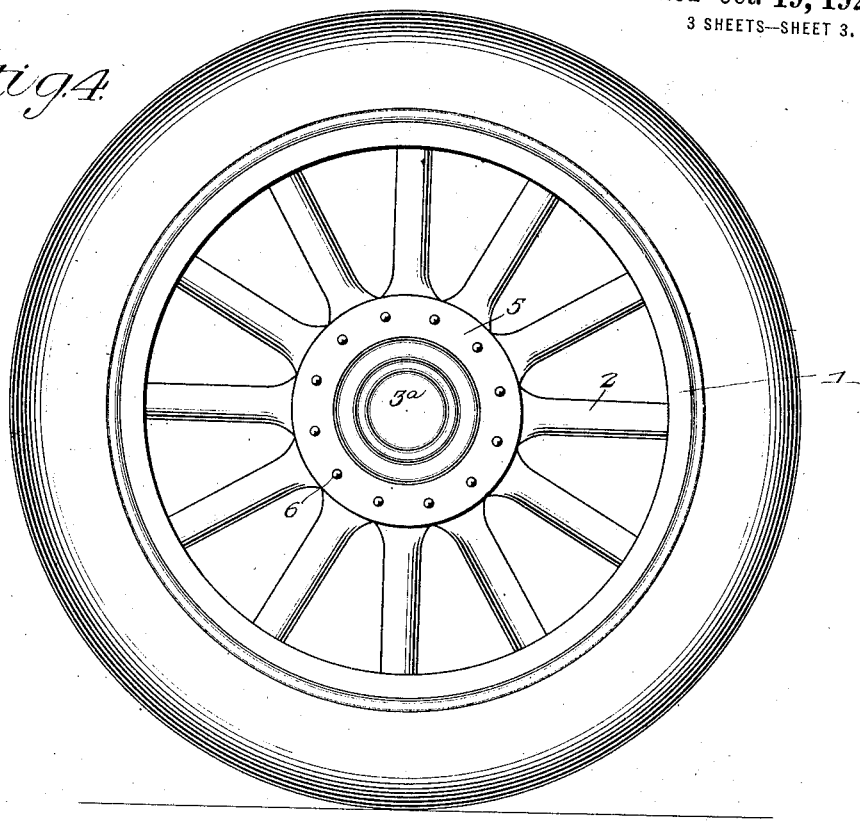
Fig. 4.
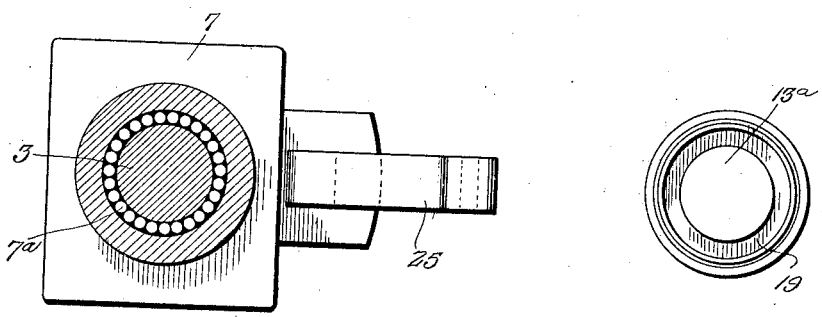
Fig. 7.
Fig. 8.
WITNESSES
INVENTOR
J. W. Price,
BY
ATTORNEYS

UNITED STATES PATENT OFFICE.

JAMES W. PRICE, OF HENRYETTA, OKLAHOMA, ASSIGNOR OF ONE-HALF TO HETTIE S. MILLER, OF SIDNEY, OHIO.

STEERING DEVICE FOR MOTOR-VEHICLES.

1,356,170.   Specification of Letters Patent.   Patented Oct. 19, 1920.

Application filed November 28, 1919. Serial No. 341,009.

*To all whom it may concern:*

Be it known that I, JAMES W. PRICE, a citizen of the United States, and a resident of Henryetta, in the county of Okmulgee and State of Oklahoma, have invented certain new and useful Improvements in Steering Devices for Motor-Vehicles, of which the following is a specification.

My invention is an improvement in steering devices for motor vehicles, and has for its object to provide a new and improved mounting for the front wheels, wherein the spindles are rigid with the wheel hubs and are journaled in bearings in forks on the ends of the front axle to swing on vertical axes, to permit the steering of the vehicle, and wherein a simple, dust-proof, inexpensive and exceedingly strong construction is provided, capable of being quickly assembled and disassembled and having a minimum of friction.

In the drawings:

Figure 1 is a vertical section through one of the improved mountings;

Fig. 2 is a section on the line 2—2 of Fig. 1;

Fig. 3 is a top plan view of the axle fork with the sleeve in place;

Fig. 4 is a side view of the wheel;

Fig. 5 is a top plan view of the sleeve;

Fig. 6 is a section on the line 6—6 of Fig. 1;

Fig. 7 is a vertical section through the inner end of the bushing and spindle, taken approximately on the line 7—7 of Fig. 1;

Fig. 8 is a top plan view of the lower screw.

In the present embodiment of the invention the wheel, which consists of the usual tire carrying rim 1 and a hub, to be described, connected to the rim by spokes 2, is provided with a spindle 3 which is integral with the hub and extends axially of the wheel, inwardly with respect to the wheel. The hub 3ª, as shown in Fig. 1, is in the form of a cap, having one of the rings or washers 4 which encircle the inner ends of the spokes abutted against the open inner end of the cap, while the other ring 5 abuts the outer face of the cap, and these rings are secured to the spokes by bolts 6 which pass between the spokes in the usual manner.

The spindle 3 is journaled within a sleeve or bushing 7, roller bearings 7ª of usual construction being interposed between the sleeve and the spindle, and the spindle is held within the bushing by means of a nut 8 which is threaded on to the reduced inner end 9 of the spindle, and the sleeve or bushing 7, as clearly shown in Fig. 1, has an inwardly extending flange or rib 10 at the reduced portion, which engages the shoulder formed between the body of the spindle and the reduced portion. Thus the spindle is held from longitudinal movement with respect to the bushing in either direction.

A ball bearing 11 is arranged between the nut 8 and the adjacent end of the bushing, the balls of the bearing being held within an annular race at the end of the bushing. The bushing has intermediate its ends, and nearer the outer than the inner end, oppositely arranged circular recesses 12, and these recesses are engaged by the inner plane ends of hinge or pivot screws 13—13ª, which have threaded engagement with bearings 14 in the ends of the arms 15 of the fork at the ends of the axle 16. These bearings are of considerable internal diameter, as shown, being, in fact, of somewhat greater internal diameter than the diameter of that portion of the bushing 7 between the bottoms of the recesses, and the inner plane ends of the screws which engage the recesses 12 engage the recesses over a large area, and cover a relatively large area of the diameter of the bushing. Thus a very strong connection is provided at this point—one which is capable of taking all of the strain at this point and safely carrying the same. Ball bearings 17 are arranged between the side walls of the recesses 12 and the screws 13, and other ball bearings 18 are arranged between the inner ends of the screws and the bottoms of the recesses. Thus the bushing may turn freely on the screws, friction being eliminated by the ball bearings.

Referring to Fig. 1, it will be seen that the lower screw 13ª is slightly different from the upper screw 13, in that the race for the ball bearing is in the end of the screw, while for the screw 13 the ball bearing race is in the bottom of the recess. An annular groove 19 is provided for the race, in the upper end of the screw 13ª. Each of the screws 13 and 13ª has a polygonal opening 20 in its outer end for engagement by a tool to turn the screw, and by means of these openings the screws may be easily removed and replaced.

When they are removed the sleeve and the wheel may be detached from the fork, while when it is desired to detach merely the wheel and spindle, this may be done by removing the nut 8. In order to protect the inner end of the spindle bearing from dust and to provide means for lubricating the same, a cap 31 is threaded on to the inner end of the sleeve 7, this cap closing the end of the sleeve, and the cap has an opening normally closed by a threaded plug 22 for permitting the insertion of the lubricant. When lubricant is arranged within the cap it will be obvious that it will work itself up into the parts, thoroughly lubricating the bearings 7ª, 17, 18 and 11.

A ball bearing 23 is arranged between the hub cap and the end of the bushing 7, the balls being held in a race in the cap, and a packing washer 24 is arranged between the hub and the bushing outside of the bearing. The steering arm 25 is connected with the bushing, as shown in Fig. 3, and the steering arms of the two wheels are connected in the usual manner, to permit the wheels to be swung simultaneously. This steering arm has an angular portion 26 which is received in a guideway 27 extending outwardly from the bushing, and a set screw 28 is provided for holding the angular portion in adjusted position.

In use, the improved mounting permits a very easy steering of the wheels, while at the same time there is but little tendency of swinging the wheels from shock and jar, as, for instance, from striking a stone, so that there is but little shock and jar on the arms of the driver at the wheel. This steadiness of the wheel is brought about in large part by the very large hinge connection between the fork arms and the bushing, the extreme width of the hinge or pivot screws tending to prevent accidental swinging of the spindles due to shock and jar. Referring to Fig. 1, it will be seen that these screws are of the same diameter as the thickness of the wheel, so that there is no leverage exerted on the screws by the wheel.

I claim:

1. A wheel mounting for front axles comprising in combination with the axle having the vertically spaced fork arms at its ends and the wheel having a cap shaped hub open at its inner end and provided with an axial inwardly extending spindle, a bushing in which the spindle is journaled, the fork arms having bearings of the same width as the thickness of the wheel, the bushing having recesses registering with the bearing and of approximately the same diameter, and pivot screws having threaded engagement with the bearings and engaging at the inner ends the recesses in the bushing, the spindle having a reduced portion at its inner end and the bushing bore being reduced to engage said reduced portion, a nut threaded on to the reduced portion of the spindle outside of the bushing, and a dust cap and lubricating chamber having a filling opening threaded on to the inner end of the bushing.

2. A wheel mounting for front axles comprising in combination with the axle having the vertically spaced fork arms at its ends and the wheel having a cap shaped hub open at its inner end and provided with an axial inwardly extending spindle, a bushing in which the spindle is journaled, the fork arms having bearings of the same width as the thickness of the wheel, the bushing having recesses registering with the bearing and of approximately the same diameter, pivot screws having threaded engagement with the bearings and engaging at the inner ends the recesses in the bushing, the spindle having a reduced portion at its inner end and the bushing bore being reduced to engage said reduced portion, and a nut threaded on to the reduced portion of the spindle outside of the bushing.

3. A wheel mounting for front axles comprising in combination with the axle having the vertically spaced fork arms at its ends and the wheel having a cap shaped hub open at its inner end and provided with an axial inwardly extending spindle, a bushing in which the spindle is journaled, the fork arms having bearings of the same width as the thickness of the wheel, the bushing having recesses registering with the bearing and of approximately the same diameter, and pivot screws having threaded engagement with the bearings and engaging at the inner ends the recesses in the bushing.

JAMES W. PRICE.